May 30, 1933.    G. D. CLARK    1,911,350
INDICATING DEVICE
Filed July 23, 1931
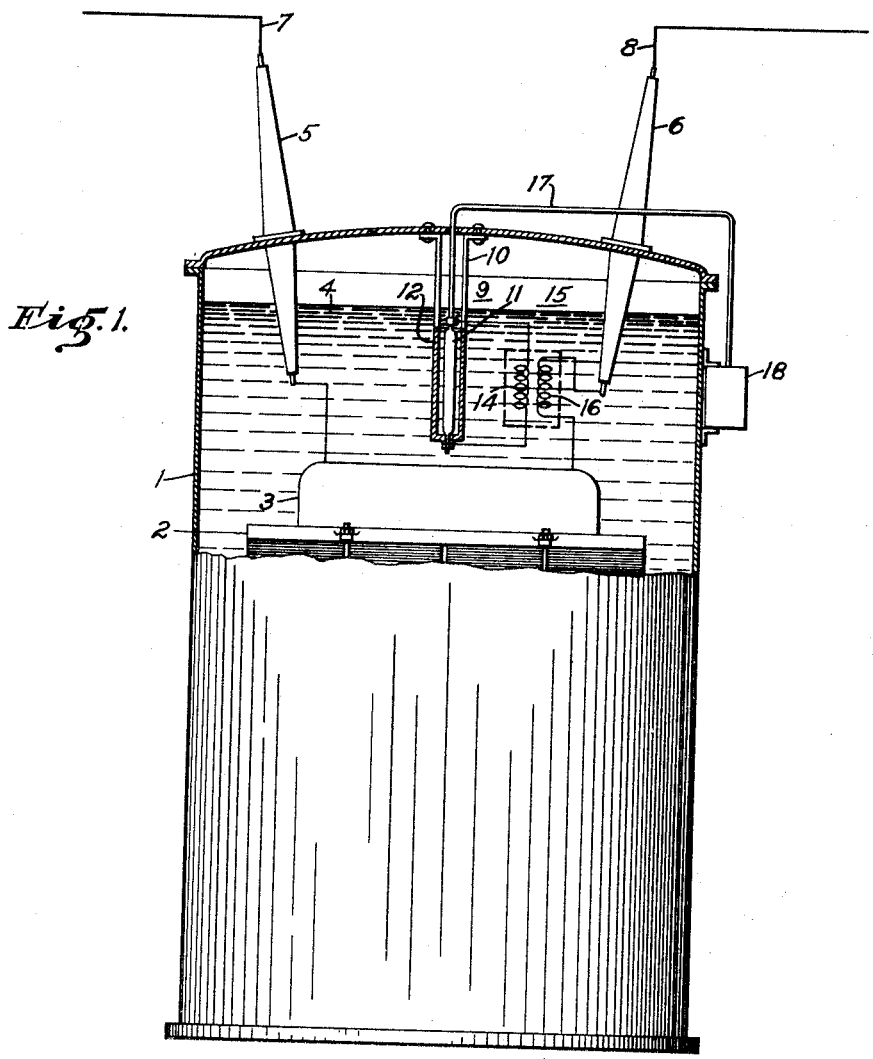
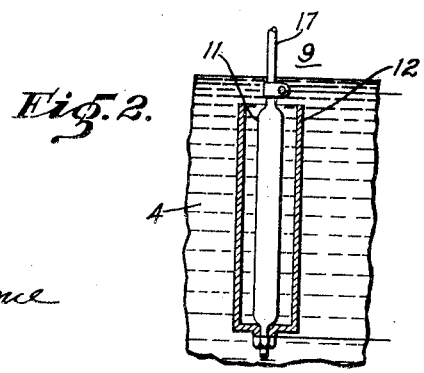
WITNESSES:
R. S. Williams
Wm. C. Groome
INVENTOR
George D. Clark.
BY
Franklin E. Hardy
ATTORNEY Patented May 30, 1933

1,911,350

UNITED STATES PATENT OFFICE

GEORGE D. CLARK, OF SHARPSVILLE, PENNSYLVANIA, ASSIGNOR TO WESTINGHOUSE ELECTRIC & MANUFACTURING COMPANY, A CORPORATION OF PENNSYLVANIA

INDICATING DEVICE

Application filed July 23, 1931. Serial No. 552,564.

My invention relates to temperature indicators for electrical apparatus and is particularly adapted for indicating the hottest spot of a transformer winding of the type that is operated immersed in an insulating and cooling fluid.

It is customary to equip transformers with temperature indicators that are adapted to register the temperature of the copper in the winding of the transformer. One type of temperature indicators for this purpose is described in Patent No. 1,156,680 to Fortescue, issued October 12, 1915 and assigned to the Westinghouse Electric & Manufacturing Company.

In this type of indicator a heat sensitive element such as the bulb of a thermometer is immersed in the cooling and insulating oil of the transformer and is heated thereby and also by a heating element that is responsive to the current flowing in the transformer windings.

The cooling fluid in which the thermometer is immersed changes its temperature gradually since its volume is sufficiently large that it takes a considerable time for a sufficient amount of the heat generated in the electrical apparatus to be transferred to the fluid to materially change the temperature of the fluid. If the heat developed in the electrical apparatus is generated at a rate that is greater than that at which heat is transferred to the surrounding medium, the temperature of the fluid will rise, since it will be required to store a greater amount of heat energy. If, on the other hand, the heat developed by the electrical apparatus is delivered to the cooling fluid more slowly than the heat is transferred therefrom to the surrounding air or other cooling medium, the temperature of the cooling fluid will fall. The temperature of the cooling fluid at any particular time represents, therefore, heat energy that has been transmitted to it from the electrical apparatus over an interval of time.

The current flowing in the windings of the transformer at a particular time may be taken as the measure of the rate at which heat is being generated therein at that time. A rapid change in the load or current in the transformer will, therefore, be followed by a like change in the heat that is subsequently conducted to the cooling fluid. Should the load on the transformer increase rapidly, the temperature of the winding will correspondingly increase, and should the load on the transformer decrease rapidly, after having been heavily loaded, the temperature of the winding will likewise correspondingly decrease. By utilizing these two values, namely, the temperature of the cooling oil and the heat being generated by the current flow at a particular time, a fairly accurate measure of the hottest temperature of the copper in the winding may be ascertained.

In order that the thermometer, the bulb of which is heated, both in accordance with the temperature of the cooling oil and in accordance with the current flowing through the winding of the transformer, may indicate the hottest spot temperature of the transformer winding, it is necessary that a proper temperature gradient exist between the thermometer bulb and the oil, this gradient corresponding to that which exists between the transformer winding and the cooling oil. In order to obtain such a gradient, it has been the practice to provide a heat insulating member of proper thermal dimensions about the bulb of the thermometer between it and the oil. For example, a tube of micarta has been employed which is forced over the thermometer bulb so as to fit tightly about the bulb and produce the proper temperature gradient between the bulb and oil due to the thermal drop through the micarta tube. This construction is, however, difficult to manufacture, since it is necessary that the tube be sufficiently tight about the bulb that no oil can leak in between the bulb and the tube. It requires considerable skill to properly fit the tube about the thermometer bulb and in practice, a certain percentage of these devices fail to give the proper gradient and are therefore discarded.

An object of my invention is to produce a temperature indicator that is responsive to the hottest spot temperature of the winding of an oil immersed electrical apparatus that is reliable in its operation and that is economical to manufacture.

A further object of my invention is to provide a temperature indicator of the above indicated character in which the correct temperature gradient between the thermal responsive element and the cooling fluid may be readily maintained and which does not change its characteristics with time and gives the same gradient at all times.

I have found that there is a gradient between the thermometer bulb and the cooling fluid without any tube covering the bulb that is about one third of the desired gradient. I have, therefore, proposed to use three such gradients in series in order that the desired total temperature gradient be obtained. In order to accomplish this result I place a metal tube around the thermometer bulb and space it therefrom to provide an oil pocket between the tube and the bulb.

In the drawing, Figure 1 illustrates a transformer in which a hot spot indicator organized in accordance with my invention is applied.

Fig. 2 is a view in vertical section, illustrating a detail of the apparatus showing the arrangement of the thermometer bulb with respect to the metal tube.

Referring to the drawing the numeral 1 indicates a tank or casing in which is contained a transformer comprising a core structure 2 and windings 3 which are immersed in an insulating and cooling fluid 4, such as oil.

Insulating bushings 5 and 6 are provided upon the cover of the transformer casing and through which extend circuit conductors 7 and 8 that connect the transformer windings to the outside transmission line.

The temperature indicating device 9 may be an indicating dial type thermometer supported in any suitable manner such as by means of the support 10 on the cover of the transformer and comprises a thermometer having a bulb 11 that is surrounded by a metallic tube 12, the tube being open at the top and closed at the bottom to form a cup within which the oil may be contained. The thermometer bulb and the metallic tube 12 are so positioned as to be immersed in the oil 4. The thermometer bulb is made of monel metal or a similar conducting material and is connected to the secondary winding 14 of a current transformer 15, the primary winding 16 of which is connected in circuit with one of the transformer terminal conductors 8. The bulb 11 may contain a thermal responsive gas and an indication of its temperature is communicated by means of an armored tubing connection 17 to an indicating device 18 in a well known manner.

Since the top of the metallic tube 12 is open it will immediately fill with oil when the device is immersed therein and since the bottom of the tube is closed, the oil is prevented from flowing upwardly through the tube, the top thus forming a cup shaped member which provides an oil pocket about the thermometer bulb. When the thermometer bulb is heated in accordance with the current flowing through the transformer windings there exists a temperature gradient between the bulb and the enclosed oil, a temperature gradient between the enclosed oil and the metallic tube and a temperature gradient between the metallic tube and the surrounding oil. These three gradients are in series and by properly designing the diameter of the tube can be arranged to produce a total gradient that is of the desired magnitude.

The above described temperature indicating device gives uniformly good results as the oil-to-metal gradient and the metal-to-oil gradients are always the same, so that different specimens similarly manufactured will always give the same results. This device, therefore, overcomes the known lack of uniformity in gradients of different specimens which utilize the micarta tube that was required to fit tightly over the thermometer bulb and that would not give the correct results should the tube permit a film of oil betwen the bulb and the tube.

Since many modifications may be made in the specific arrangement of the apparatus illustrated and described without departing from the spirit of my invention, I do not wish to be limited other than by the scope of the appended claims.

I claim as my invention:

1. The combination with a transformer immersed in an insulating and cooling liquid, and a thermometer bulb adapted to be influenced in accordance with the temperature of the insulating liquid, of means for obtaining a temperature gradient between said bulb and said liquid comprising a metallic tube surrounding said bulb and spaced therefrom, said tube containing a heat transferring liquid surrounding said bulb.

2. The combination with a transformer immersed in a cooling liquid and a thermometer bulb adapted to be influenced in accordance with the temperature of the fluid, of means for obtaining a desired temperature gradient between the thermometer bulb and said liquid comprising a metallic cup surrounding the bulb of said thermometer and immersed in and filled with said liquid.

3. The combination with a transformer immersed in a cooling liquid and a thermometer having a bulb adapted to be influenced in accordance with the temperature of the liquid, of means electrically associated with said thermometer for influencing said thermometer bulb in proportion to the current in said transformer, and means for obtaining a plurality of temperature gradients in series between said bulb and said liquid comprising a metallic tubular member spaced from and surrounding said thermometer bulb in heat conducting relation with said cooling liquid and a heat conducting fluid that is in heat conducting relation between said thermometer bulb and said tube.

4. The combination with a transformer immersed in a cooling liquid and a thermometer having a bulb adapted to be influenced in accordance with the temperature of the liquid, of means electrically associated with said thermometer for influencing said thermometer bulb in proportion to the current in said transformer, and means for obtaining a desired temperature gradient between said bulb and said liquid comprising a cup having its walls spaced from and surrounding the bulb, said bulb and cup being immersed in and filled with said liquid.

5. The combination with a transformer immersed in a cooling liquid and a thermometer having a bulb adapted to be influenced in accordance with the temperature of the liquid, of means electrically associated with said thermometer for influencing said thermometer bulb in proportion to the current in said transformer, and means for obtaining a desired temperature gradient between said bulb and said liquid comprising a tube surrounding the bulb closed at its lower end, said tube containing a heat transferring liquid surrounding said bulb.

6. The combination with a transformer immersed in a cooling liquid and a thermometer having a bulb adapted to be influenced in accordance with the temperature of the liquid, of means electrically associated with said thermometer for influencing said thermometer bulb in proportion to the current in said transformer, and means for obtaining a desired temperature gradient between said bulb and said liquid comprising a tube surrounding the bulb, said tube being closed at its lower end and open at its upper end and positioned with its upper end below the surface of the liquid.

7. In combination, a transformer immersed in cooling liquid, a thermometer bulb of electrically conducting material adapted to be influenced in accordance with the temperature of said liquid, means for passing an electric current through said bulb that varies in accordance with the current flowing in said transformer to correspondingly heat said bulb and said transformer, and means for obtaining a desired temperature gradient between said bulb and said liquid comprising a metallic cup surrounding the bulb and spaced therefrom, said metallic cup being immersed in and filled with said liquid.

8. In combination, a transformer winding immersed in a cooling liquid, a thermometer bulb of electrically conducting material positioned to be influenced in accordance with the temperature of said liquid, means for heating said bulb to correspond to the heat of said transformer comprising means for passing an electric current that varies in accordance with the current flowing in said transformer through said bulb, and a tubular member surrounding said bulb for controlling the rate of heat transfer from said bulb to said cooling liquid of such dimensions as to produce the same temperature difference as exists between the transformer winding and the cooling liquid, said tubular member being closed at its lower end and open at its upper end and positioned with its upper end below the surface of the liquid.

In testimony whereof, I have hereunto subscribed my name this 16th day of July 1931.

GEORGE D. CLARK.